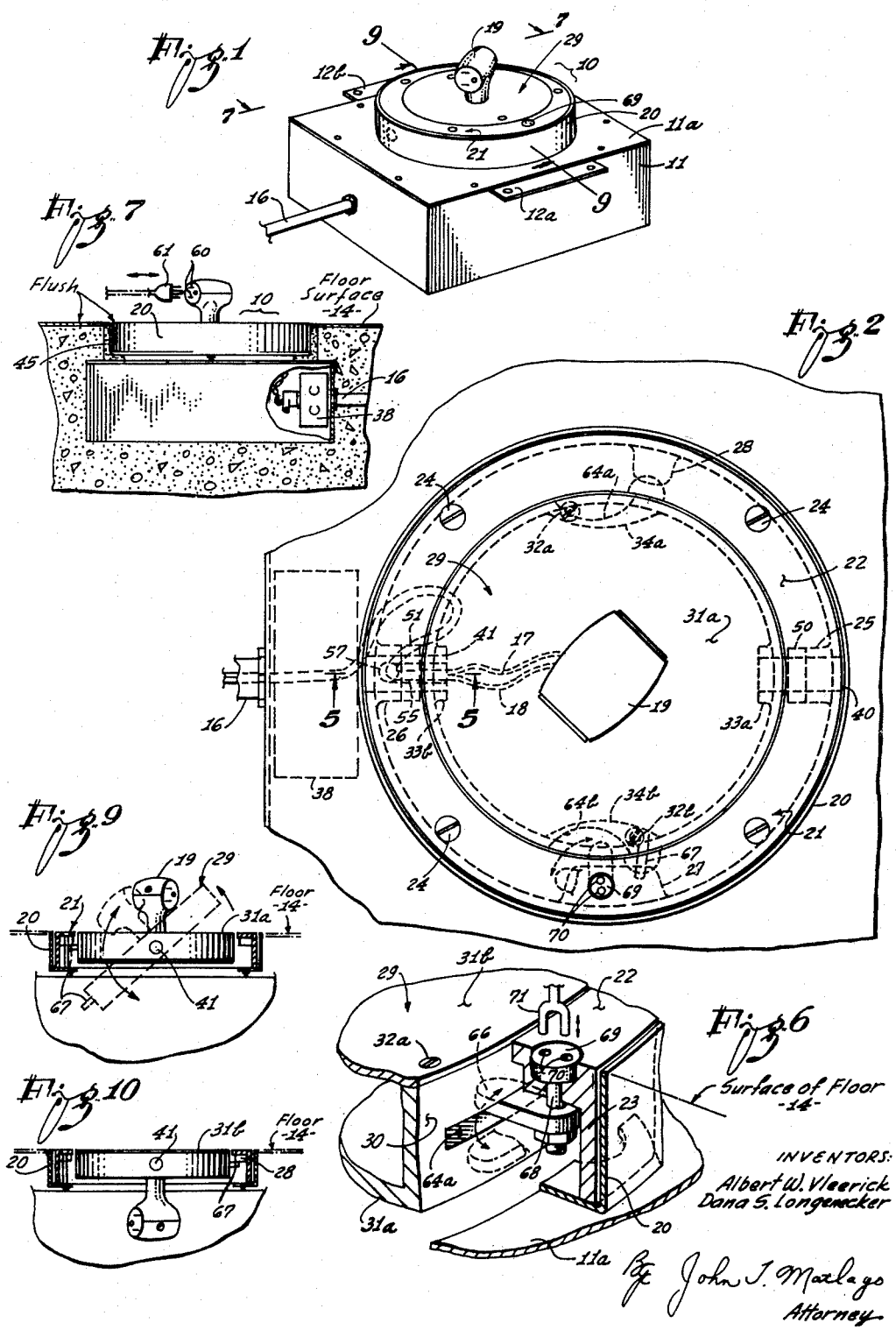

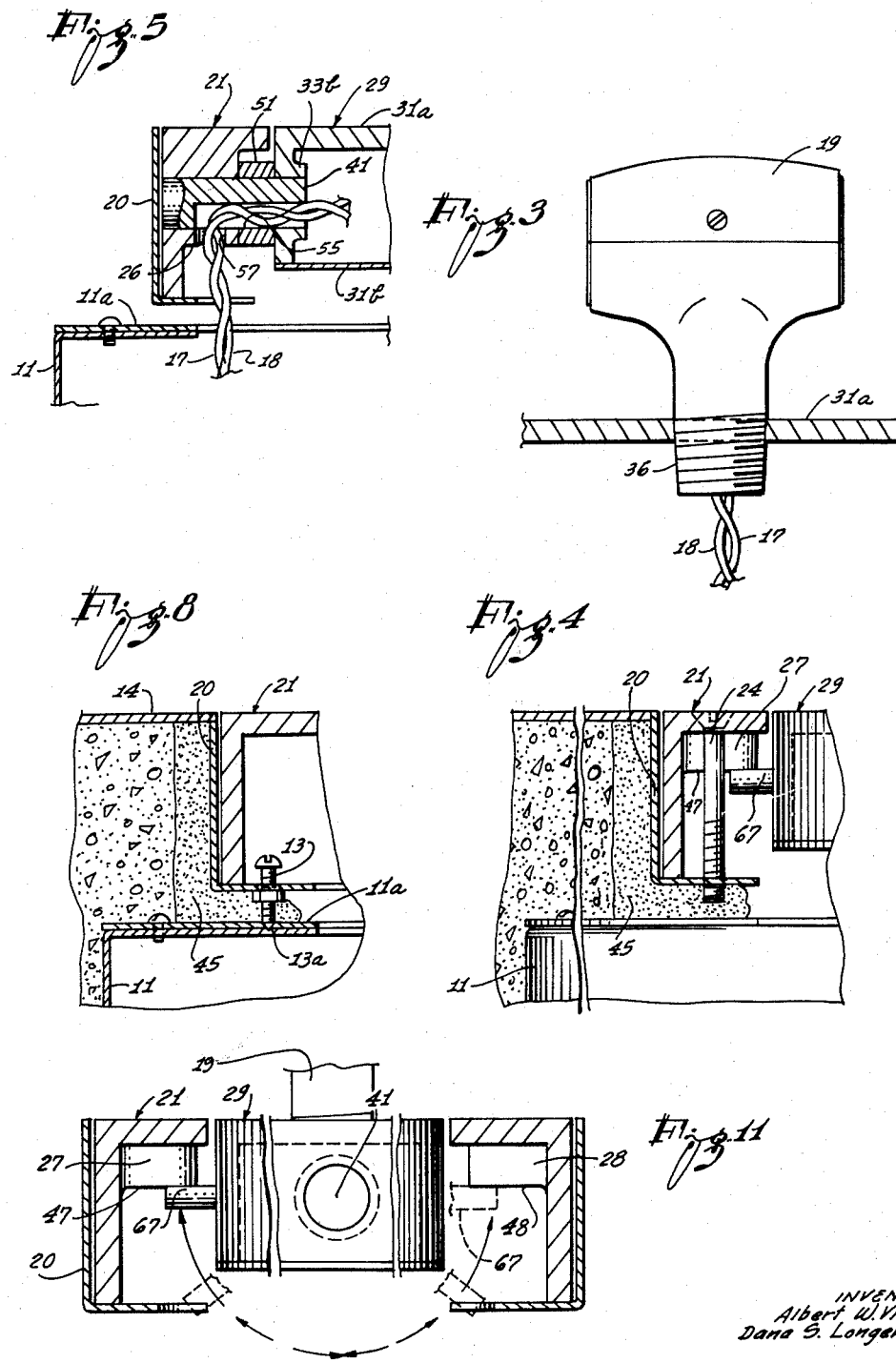

United States Patent Office 3,189,862
Patented June 15, 1965

1

3,189,862
FLOOR RECEPTACLE MOUNT
Albert W. Vleerick, Downey, and Dana S. Longenecker, Arcadia, Calif., assignors to C. W. Cole & Co., Inc., El Monte, Calif., a corporation of California
Filed Dec. 3, 1962, Ser. No. 241,818
5 Claims. (Cl. 339—34)

This invention relates to electrical floor mounts and more particularly to an electrical receptacle mounting unit in which the mount for the receptacle is pivotally supported so that by rotating the mount into an up position the receptacle can be exposed for use above the floor and by rotating the mount into a down position the receptacle can be concealed within a recess provided in the floor.

It is common practice to provide electrical receptacles or outlets in one or more convenient locations on the floor of a room to enable power to be supplied for various types of electrical equipment such as used in school rooms, offices, and the like. When these electrical receptacles are permanently installed above the floor, they create a problem if the equipment requiring the power is rearranged in the room or no longer being used. Therefore, in some instances, it has been the practice to provide recesses or openings in the floor in which the electrical receptacles can be mounted. By providing a flush plate or cover which can be placed over the recess, the receptacle can be exposed for use by removing the plate, and, when no longer needed, concealed by replacing the plate over the recess. The difficulties presented by this approach to the problem is that the electrical receptacle, being submerged in the floor, is cumbersome to use, and, furthermore, the removal of the flush plate leaves an opening in the floor which is not pleasing in appearance. Furthermore, when the flush plate is removable it must be stored in readiness for when the receptacle is no longer required.

Accordingly, one of the objects of the present invention is to provide an electrical receptacle which is pivotally mounted such that it can quickly and readily be made available for use above the floor when needed, or can, just as readily, be rotated such that it is concealed in the floor, with the opening in the floor covered to as to present a pleasing and attractive appearance.

Another object of this invention is to provide a rotatable mount for an electrical receptacle which mount is supported over a recess provided in a floor such that the mount can be readily flipped over and latched when the receptacle is not in use, and thereby provide a protecting cover over the recess which is flush with the floor.

Another object of this invention is to provide a sturdy construction for a simply designed rotatably mounted floor receptacle, which construction is pleasing in appearance both when the electrical receptacle is exposed for use and when it is concealed in the floor. Another object of this invention is to provide a simple arrangement for limiting the direction of movement of a rotatable mount for an electrical receptacle to prevent the lead wires from becoming entangled and worn due to repeated repositioning of the mount in its support.

The above and further objects and purposes of this invention will be apparent from the detailed description hereinafter apppearing when taken in conjunction with the appended drawings forming a part thereof and showing a preferred embodiment of the invention and in which:

FIG. 1 is a perspective view of an electrical receptacle mounting unit positioned on an outlet box;

FIG. 2 is a partial top plan view of the mounting unit shown in FIG. 1;

2

FIG. 3 is a detail showing the receptacle secured to the mount;

FIG. 4 is a detail showing how the mounting ring is secured within the housing;

FIG. 5 is a detail of the mounting unit taken along the line 5—5 of FIG. 2;

FIG. 6 is a perspective view of a portion of the receptacle mounting unit showing the details of the latching mechanism for locking the mount in position in the mounting ring;

FIG. 7 is a side view of the mounting unit taken along the line 7—7 in FIG. 1, showing the unit installed with the outlet box positioned in a recess provided in a floor;

FIG. 8 is a detail showing how the housing or casing for the mounting unit is installed on the outlet box provided in the recess in the floor;

FIG. 9 is a partly cross-sectional view of the receptacle mounting unit showing the electrical receptacle in position for use, and showing in dotted lines how the receptacle mount can be pivoted on its support for concealment of the receptacle in the recess of the floor;

FIG. 10 is a view similar to that in Fig. 9 showing the mount positioned such that the electrical receptacle is concealed in the floor; and FIG. 11 is a view of a portion of the mount showing how its rotational movement within the mounting ring is limited.

Referring to the drawings, FIG. 1 shows a perspective view of an electrical receptacle mounting unit 10 positioned on an outlet box 11. The mounting unit 10 includes an outer circular casing or housing 20, a mounting ring 21 which is concentrically positioned and secured within the circular housing 20, and a disc-shaped mount or platform 29 which is pivotally supported within mounting ring 21. Secured on the surface of mount 29 is an electrical receptacle 19. Receptacle 19 is provided with a pair of slots 60 for entrance of the blades of an attachment plug 61, as shown in FIG. 7, for example. As will be explained in the ensuing description, the mount 29 is rotatable within mounting ring 21 such that receptacle 19 is either in an upright position, as shown in FIG. 1, or in a down position in which it extends into a circular opening provided in the upper surface 11*a* of outlet box 11. The outlet box 11 is provided with tabs 12*a* and 12*b* which aid in maintaining the box in position when installed in a floor. An opening in the side wall of box 11 has a conduit 16 extending therethrough which carries lead wires 17 and 18 (FIG. 2) from the electrical wiring source to receptacle 19.

Reference will next be made to FIGS. 2–6 to describe the details of construction of the floor receptacle mounting unit 10. The stationary outer circular casing or housing 20 has an L-shaped cross-section, as shown in FIGS. 5 and 6. As will be subsequently described in connection with FIG. 8, during installation of the mounting unit 10, housing 20 is employed to secure and position the mounting ring 21 at a proper level in a recess provided in the floor. Mounting ring 21 is preferably formed of a casting with a machined annular upper surface 22 and a machined circular wall 23 (FIG. 6), which wall is spaced with a small clearance from the inside wall of housing 20 when the lower edge of wall 23 rests on the lower inside surface of housing 20. As shown in FIGS. 2 and 5, below the surface 22 of mounting ring 21 and on diametrically opposed inside surfaces of wall 23, are cast a pair of bosses 25 and 26. These bosses are provided with aligned bores whose center line corresponds to the axis of rotation of the mount 29. In addition, as shown in FIG. 2, mounting ring 21 has cast thereon a pair of pads 27 and 28 which are located to the right of the central plane formed by rotation of the mount 29. Pads 27 and 28 are machined to form stopping surfaces 47 and 48, respectively, on the underside of surface 22 of mounting ring 21, as shown in FIGS. 4 and 11. The mounting ring 21 is secured within the housing 20 by four screws 24 which screws extend through four equally spaced openings provided in annular surface 22 and engage threaded holes provided in the base of housing 20, as shown in detail in FIG. 4.

The cylindrical disc-shaped mount or platform 29 is pivotally supported in the central aperture formed by mounting ring 21. This mount 29, as shown in FIG. 6, is comprised of a cast cylindrical body 30 provided with a circular supporting plate 31b which is secured to one end thereof by screws 32a and 32b, and a circular cover plate 31a which is preferably formed to be integral with the other end of the body 30. Within cylindrical body 30, on diametrically opposed sides thereof, are bosses 33a and 33b (FIG. 2) which bosses are provided with aligned bores whose center line corresponds to the axis of rotation of the mount 29. Also within cylindrical body 30, on the opposed sides thereof which swing about the axis of rotation, are provided bosses 34a and 34b which bosses enable latching slots 64a and 64b (FIG. 6) to be milled on the outer cylindrical surface of body 30. As shown in FIG. 3, the supporting plate 31a has a threaded opening in the center thereof in which electrical receptacle 19 is held by threads on hollow shaft 36 which shaft forms an integral part of the receptacle 19.

As is now clear from FIGS. 2 and 5, upon assembling the mount 29 within mounting ring 21 the bores in bosses 25 and 26 of mounting ring 21 enable respective pins 40 and 41 to be inserted therethrough from the outside of mounting ring 21 into the aligned bores provided in respective bosses 33a and 33b of mount 29. These pins 40 and 41 have a press fit in the respective bores of bosses 25 and 26 of the mounting ring, and a free fit in the bores 33a and 33b of the mount 29, to enable the mount to be pivoted about these pins. Spacers 50 and 51 position the disc-like mount 29 concentrically within the circular opening provided in mounting ring 21. Pin 41 is provided with a longitudinal slot 55 along the lower edge thereof which extends to a radial hole 57 directed into the outlet box 11. Slot 55 and hole 57 in pin 41 enable the lead wires 17 and 18 connected to receptacle 19 to be carried to the junction box 38. Although lead wires 17 and 18 have been shown and described as only passing through openings in pin 41, it should be understood that pin 40 can also be similarly adapted to have lead wires passed therethrough.

Having described the details of how the mount 29 is supported within the mounting ring 21, an explanation will next be presented of how the mount 29 is limited in its rotational movement so as to prevent the lead wires 17 and 18 from becoming frayed or entangled when the mount 29 is rotated about its supporting structure many times, as encountered during prolonged use. As shown in FIGS. 2 and 4, the mount 29 has secured to the periphery thereof a stopping pin 67 which pin encounters one of the pads 27 or 28 as the mount 29 with the receptacle thereon is rotated to an upward or downward position. Thus, stopping pin 67 rests on surface 47 of pad 27 when the electrical receptacle 19 is in its operating position, as shown in FIG. 4; and when the mount 29 is flipped over, as shown in FIG. 10, the stopping pin 67 now rests on the opposite surface 48 of pad 28. As noted in FIG. 11, to permit the mount 29 to be rotated, a clearance cut-out must be provided in the lower surface of housing 20 and the surface 11a of outlet box 11.

As shown in detail in FIG. 6, to secure the mount 29 in either its up or down position, a quarter-turn latch 66 is firmly secured to move with a pin 68 which is positioned to rotate in an opening provided in the upper surface 22 of mounting ring 21. Head 69 of pin 68 is provided with a pair of holes 70 in which key 71 can be inserted so as to rotate the latch 66 into the milled slot 64a of the body 30, to thereby lock mount 29 in position.

Having described the details of the electrical receptacle mounting unit 10, a description will next be given of how the mounting unit is installed in a recess provided in the floor of a room. The outlet box 11 is permanently installed in the recess of the floor at the time, for example, that the concrete is poured to form this floor. The top surface 11a of outlet box 11 is located within rather loose tolerance limits below the surface of the floor 14. The conduit 16 leading out of box 11 extends to the source of power through openings provided in the floor. When the box 11 is installed, an enlarged dummy casing or housing is used to form the opening in which the housing 20 is to be inserted. Housing 20 is positioned over a central opening provided in the surface 11a such that the tips of each of three equally spaced adjusting screws 13, one of which is shown in FIG. 8, can fit into respective dimples 13a provided on the portion of surface 11a surrounding the central opening. These adjusting screws 13 are then used to accurately position the housing 20 at the proper level for the floor 14 which may have a covering such as tile or linoleum thereon. The space between the housing 20 and the opening in the concrete is then filled with grout 45, as shown in FIG. 8, for example. It should now be clear that when mounting ring 21 is inserted in housing 20, and secured therein by screws 24, the surface 22 of mounting ring will be flush with the surface of floor 14.

It should be further noted that the center of the bores in bosses 33a and 33b of mount 19 are located midway of the height of the body of mount 29, such that, irrespective of the up or down position of this mount, its exposed surface is flush with the floor.

From the above it should now be clear that when the receptacle 19 is not in use, the attachment plug 61 is removed and the mount 29 unlocked with key 71. The mount can then be pivoted such that its underside cover plate 31b is exposed as a flush plate over the recess provided in the floor 14. This flush plate is sufficiently strong so that it can be stepped on without injury to the plate or the receptacle. Inasmuch as the top surface of the housing 21 and the exposed surface of mount 29 are flush with each other, and the surface of the floor, the unit provides a smooth reliable and pleasing construction in which the receptacle 19 may be easily and quickly made accessible for use when desired, or concealed in the floor, by merely unlocking the latch 66 and flipping the mount 29 over. It should be noted that the construction effectively keeps dirt out of the receptacle and the floor box.

From the above description it will be appreciated that there has been provided a novel electrical floor mount well adapted for its intended function. Furthermore, while the electrical floor mount has been described in detail, it will be obvious that various changes and modifications may be made therein which fall within the spirit of the invention and it is intended to cover all such modifications, being limited in this respect only as may be necessary by the scope of the claims hereto appended.

What is claimed is:

1. In a floor receptacle mounting unit, a mounting device adapted to be secured in a recess provided in a floor, said device having an annular surface defining a central aperture; a cylindrical platform whose top or bottom flat circular surface is capable of substantially covering said central aperture when concentrically positioned therein ; an electrical receptacle secured on one surface of said platform, said platform adapted to be rotatably supported within the central aperture of said device such that the top or bottom surface of said platform can be positioned flush with the annular surface of said mounting device whereby said receptacle can be positioned for exposure above the floor or concealment below the surface of the floor; and, means for limiting the movement of said platform to a semi-circular path between the said two positions.

2. A floor receptacle mount comprising: a disc-shaped platform formed of a circular shell provided with a supporting plate as one surface thereof and a cover plate as the other surface thereof; an electrical receptacle secured to protrude from the center of the supporting plate of said platform; a mounting ring encircling said platform; a pair of supporting pins each secured in a diametrically opposed portion of said mounting ring, said pins protruding into openings provided in diametrically opposed side portions of said platform such that the platform is rotatably supported on said pins within said mounting ring; electrical leads extending from the receptacle through apertures provided in at least one of said pins; a projecting member extending from a side portion of said platform and located at substantially ninety degrees from the rotating axis thereof; and a pair of stopping pads each located on an opposed portion of the underside of said mounting ring for engaging said projecting member to arrest the rotation of the platform in said mounting ring in a first position in which the supporting plate of the platform with the receptacle secured thereto is in an upright position; and in a second position in which the cover plate of the platform is in an upright position.

3. An electrical floor mount comprising: a mounting device adapted to be secured in a recess provided in a floor, said device having an annular surface defining a central aperture; a supporting structure consisting of a pair of stationary pins, each located on diametrically opposed portions beneath the annular surface of said mounting device and extending into said central aperture; a cylindrical platform concentrically positioned in said aperture and rotatably mounted on said pins, whereby said platform may be rotated about an axis located diametrically across said aperture; and an electrical receptacle secured to one surface of said platform, said platform being provided with a radially extending pin on the periphery thereof which contacts the bottom of the annular surface to thereby arrest its rotation within the aperture of said mounting device when the one surface of the platform carrying the receptacle is in an upright position, or when the other surface of the platform is in an upright position.

4. An electrical floor mount comprising: a mounting device adapted to be secured in a recess provided in a floor, said device having an exposed annular upper surface defining a circular opening; a supporting structure including a pair of pins, each located and held on diametrically opposed portions beneath the annular surface of said mounting device and extending into said circular opening; a cylindrical platform pivotally mounted on said pins and capable of covering said circular opening when concentrically positioned therein whereby said platform may be pivoted about an axis located diametrically across said circular opening so as to substantially cover said opening when either the top or bottom surface of said platform is in an exposed position flush with the exposed annular surface of said mounting device; and an electrical receptacle secured to protrude from the center of one of the surfaces of said platform, said cylindrical platform being provided with a radially extending projection on the periphery thereof which contacts the bottom of the annular surface of the mounting device to thereby arrest the rotation of the platform within the circular opening of said mounting device in a first position in which the surface of the platform provided with a receptacle is in an upright covering position substantially flush with the exposed annular surface of said mounting device, and in a second position in which the surface of the platform provided with the receptacle is in a downward position so as to conceal the receptacle in the recess provided in the floor and the other surface of the platform is in an upright covering position substantially flush wtih the exposed annular surface of said mounting device.

5. A floor receptacle mount comprising: a hollow disc shaped platform provided with a supporting plate as the top surface thereof and a cover plate as the bottom surface thereof; an electrical receptacle secured to protrude through the center of one of the plates of said platform; a mounting ring encircling said platform; said mounting ring having an upper annular surface; a pair of supporting pins each held in a diametrically opposed portion beneath the annular surface of said mounting ring, said pins fitted into openings provided in diametrically opposed side portions of said platform such that the platform is pivotally supported on said pins within said mounting ring; electrical leads extending from the receptacle into the interior of said platform and through an aperture provided in at least one of said pins; a member extending from a side portion of said platform and located at substantially ninety degrees from the pivoting axis thereof; and a pair of stopping pads each located on an opposed portion of said mounting ring beneath the annular surface thereof for engaging said member to arrest the rotation of the platform in said mounting ring in a first position in which the surface formed by the plate of the platform with the receptacle secured thereto is substantially flush with the exposed annular surface of said mounting ring, and in a second position in which the surface formed by the other plate of the platform is substantially flush with the exposed annular surface of said mounting ring.

References Cited by the Examiner

UNITED STATES PATENTS

| | | | |
|---|---|---|---|
| 1,928,198 | 9/33 | Buchanan | 220—3.4 X |
| 2,301,526 | 11/42 | Dupler. | |
| 2,866,956 | 12/58 | Miller et al. | 339—34 |
| 2,900,101 | 8/59 | Clark | 220—3.4 |
| 2,936,092 | 5/60 | Johnson | 220—3.4 X |
| 3,001,164 | 9/61 | Pietzsch | 339—2 |
| 3,081,896 | 3/63 | Haskins | 220—3.4 |

FOREIGN PATENTS

| | | |
|---|---|---|
| 658,303 | 3/38 | Germany. |
| 456,528 | 11/36 | Great Britain. |

JOSEPH D. SEERS, *Primary Examiner.*